United States Patent Office 3,465,089
Patented Sept. 2, 1969

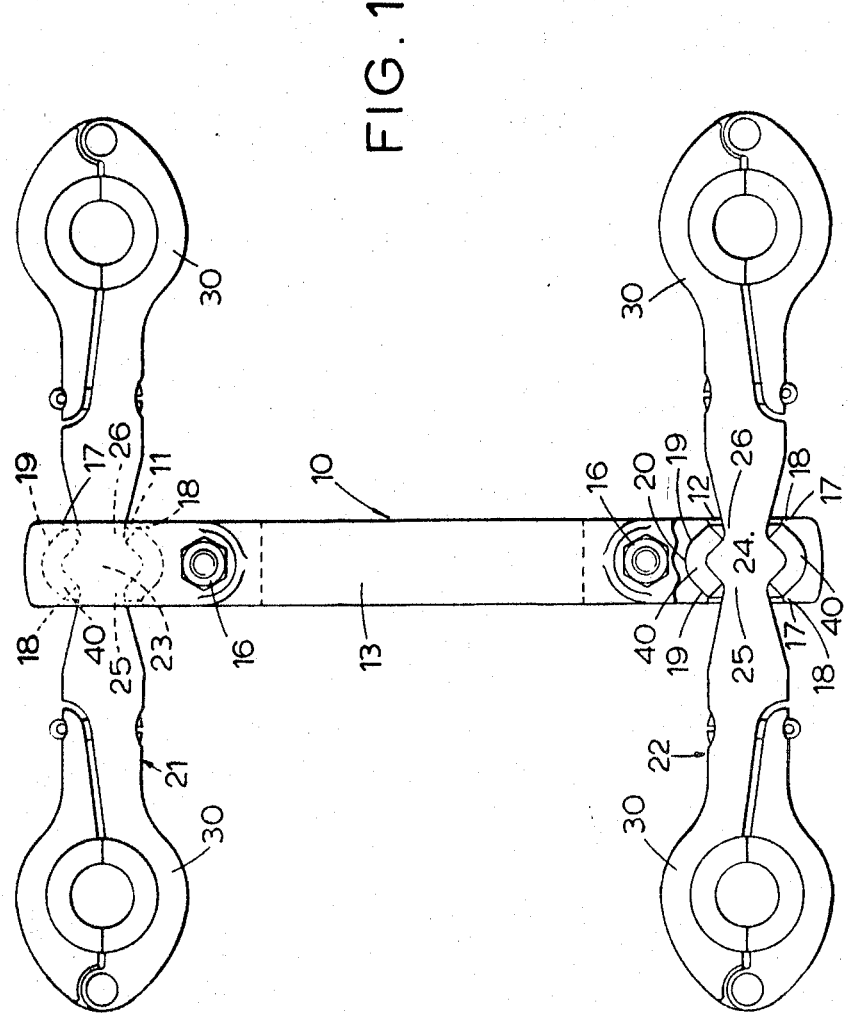

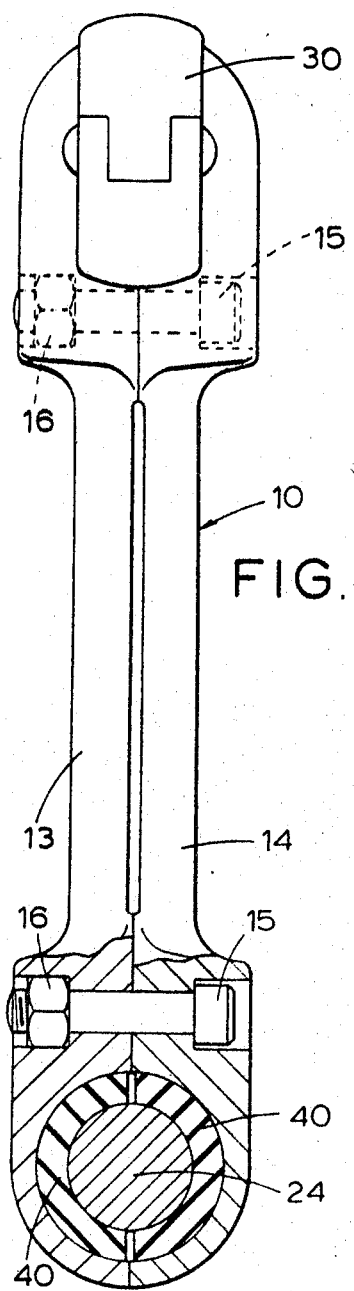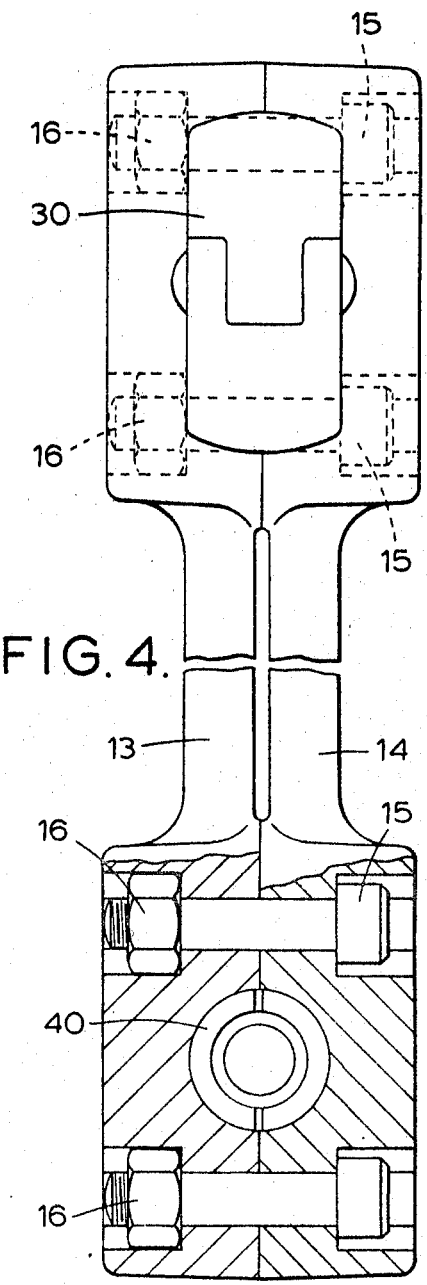

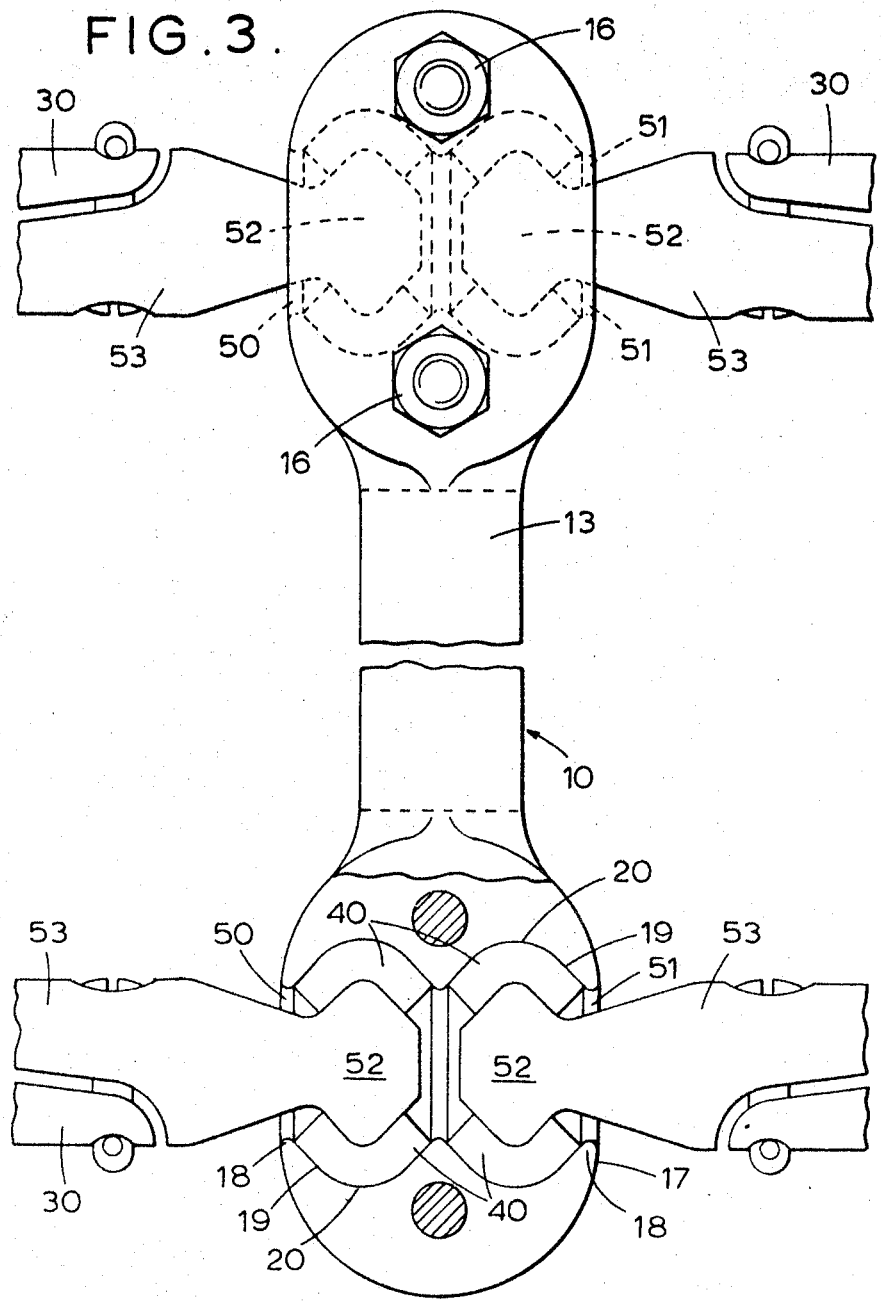

3,465,089
SPACERS FOR OVERHEAD TRANSMISSION LINES
Ralph P. Torr, New Malden, Surrey, England, assignor to Andre Rubber Company Limited, Surbiton, Surrey, England, a British company
Filed June 18, 1968, Ser. No. 737,937
Claims priority, application Great Britain, June 19, 1967, 28,169/67
Int. Cl. H02g 7/12
U.S. Cl. 174—40                             5 Claims

ABSTRACT OF THE DISCLOSURE

A spacer for bundled conductors of overhead transmission lines comprising a rigid elongate link arm having at least one cavity formed therein at each end. Each cavity receives a knob formed on a respective spacer arm mounting at least one clamp. In one embodiment, each spacer arm has a central knob and a clamp at each end, such that the arms extend perpendicular to the link arm. In a second embodiment, each spacer arm has a knob at one end and a clamp at the other end, the spacer arms being arranged in pairs, the arms in each pair extending in opposite directions away from the link arm. The knob of each spacer arm is embraced by elastomeric material to permit pivoting of the spacer arm to a limited extent under resilient constraint relative to the link arm.

BACKGROUND OF INVENTION

This invention relates to spacers for bundled conductors of overhead transmission lines and particularly to spacers for mutual spacing of four parallel separate conductors. The function of such spacers is to hold the separate conductors apart while permitting a given degree of freedom of movement of the conductors with respect to one another.

SUMMARY OF INVENTION

According to the invention there is provided a spacer for bundled conductors, of overhead electrical transmission lines, comprising at least two rigid elongate spacer arms each mounting at least one conductor clamp and being formed with a knob, and a rigid elongate link arm formed with at least two cavities, each of which receives the knob of a spacer arm, each of the knobs being at least partially embraced within the cavity in which it is received by an elastomeric material such that each spacer arm may pivot to a limited extent with respect to the link arm under resilient constraint.

BRIEF DESCRIPTION OF DRAWINGS

FIGURE 1 is a front elevation, partly in section of a spacer embodying the invention,
FIGURE 2 is a end view elevation of the spacer shown in FIGURE 1,
FIGURE 3 is a fragmentary front elevation of a second embodiment of the spacer, and
FIGURE 4 is a fragmentary elevation of the spacer shown in FIGURE 3.

DESCRIPTION OF PREFERRED EMBODIMENT

Referring to FIGURES 1 and 2 there is shown a spacer comprising a rigid elongate link arm 10 having a cavity 11, 12 formed therein at each end. The link arm 10 is formed as two similar elongate halves 13, 14 secured together by means of bolts 15 and nuts 16, the heads of bolts 15 and the nuts 16 being recessed into the body of the link arm 10.

The half link arms 13 and 14 have recesses which each form one half of a cavity 11 and 12. Each cavity is circular and each recess is semi-circular in any cross-section taken perpendicular to the general line of a spacer arm extending through the cavity as referred to below. The diameter of successive cross-sections decreases slightly from an outer edge 17 of each cavity to form a rounded flared peripheral lip 18, then increases uniformly to form a truncated cone recess wall 19, and then increases at a uniformly decreasing rate to a maximum diameter at the central plane of symmetry 20. The shape of the complete cavity is best seen in the lower half of FIGURES 1 and 2.

The spacer further comprises two rigid elongate spacer arms 21 and 22 having respective central knobs 23, 24. The knobs 23, 24 are received in the cavities 11, 12 respectively. The knobs 23, 24 are similar in external shape to the cavities 11, 12 but smaller in dimension. Each arm has a neck 25, 26, on each side of its central knob so as to provide adequate clearance between the arm and the peripheral lips 18 to permit substantial angular movement of the arm with two degrees of freedom of pivotal movement relative to the link arm.

Each arm 21, 22 has at its two free ends clamps 30 of suitable design for receiving and clamping conductors of a four conductor, bundled conductor, transmission line. Clamps 30 are of the kind disclosed in our British Patent No. 929,693 (U.S. Patent No. 3,161,721). It will be seen that a main body portion of each clamp 30 is formed integrally with its associated spacer arm 21, 22.

Elastomeric material 40, such as natural or synthetic rubber, partially embraces each knob within each cavity. This material may be in the form of a single shell but is conveniently, as illustrated in FIGURE 2, in the form of two pads associated one within each recess of a cavity. The elastomeric material is placed under substantial compression during assembly of the spacer. This is accomplished by wrapping around the knobs or placing in the recesses somewhat more than a sufficient thickness of elastomeric material to fill the shell space between the knobs and the recesses, assembling the two halves of the link arm 13, 14 with the knobs between the two recesses and inserting and tightening the nuts 16 on the bolts 15. If desired, the material 40 may be cemented or bonded to the interior surfaces of the recesses or the knobs or both.

It will be appreciated that the resilient joint between the link arm 10 and each spacer arm 21, 22 disclosed above provides a resiliently constrained universal joint permitting angular movement with two degrees of freedom of pivotal movement relative to the link arm. Since the clamps 30 at each end of a spacer arm 21 or 22 are substantially rigidly interconnected, movement of these two clamps horizontally towards one another is substantially impossible. The link arm is arranged to be generally vertical in use.

Referring now to FIGURES 3 and 4 there is shown a modification of the spaced of FIGURES 1 and 2. Instead of single cavities at each end of the link arm, twin cavities are provided, and instead of two spacer arms each bearing two clamps, four spacer arms each bearing one clamp are provided. Otherwise similar parts are identified by similar reference numerals to those employed in FIGURES 1 and 2.

Each end of the assembled link arm defines twin cavities 50 and 51 which are of similar shape to the cavities 11, 12. Received within each cavity 50 and 51 and partially embraced by elastomeric material is an end knob 52 of a spacer arm 53. Further details of the modification will be apparent from a study of FIGURES 3 and 4.

It will be appreciated that the spacer as shown in FIGURES 3 and 4 permits some resiliently constrained independence of movement between each pair of generally horizontally aligned clamps, whereas in the embodiment of FIGURES 1 and 2 each spacer arm pivots as a substantially rigid whole, causing related opposite movement of the clamps at each end thereof. In the modified spacer, relative movement of two clamps horizontally towards and away from one another is possible, but under considerably greater resilient constraint than pivotal movement. An advantage common to the two described spacers is that any movement, linear or pivotal, of any one conductor is transimtted through at least one resiliently constrained universal joint to the other three conductors, thus giving a damping and detuning effect to the spacer as a whole.

What is claimed is:

1. A spacer for bundled conductors of overhead electrical transmission lines, comprising: two rigid elongate spacer arms each formed with a central knob; a conductor clamp mounted at each end of each spacer arm; an elongate link arm formed at each of its ends with a cavity, each of the cavities opening to two opposite sides of the link arm and receiving the knob of a respective one of the spacer arms, such that two half-portions of each spacer arm extend in opposite directions away from and generally perpendicular to the link arm; and elastomeric material at least partially embracing each knob within the cavity in which it is received.

2. A spacer as claimed in claim 1, wherein the elastomeric material is compressed between each knob and the bounding wall of the associated cavity.

3. A spacer as claimed in claim 1, wherein the elastomeric material is bonded to the knob.

4. A spacer as claimed in claim 1, wherein the elastomeric material is bonded to the cavity wall.

5. A spacer as claimed in claim 1, wherein the link arm comprises two similar elongate halves, each link arm half having recesses, corresponding recesses in the two halves being arranged to register when the halves are secured together to form the cavities.

References Cited

UNITED STATES PATENTS

| 3,157,731 | 11/1964 | Torr | 174—146 X |
| 3,270,123 | 8/1966 | Short | 171—146 X |

FOREIGN PATENTS

| 240,945 | 6/1965 | Austria. |

OTHER REFERENCES

German printed application, No. 1,035,230, July 31, 1958, Korber.

LARAMIE E. ASKIN, Primary Examiner

U.S. Cl. X.R.

174—146